United States Patent
Bai et al.

Patent Number: 5,660,953
Date of Patent: Aug. 26, 1997

[54] RECHARGEABLE MANGANESE DIOXIDE CATHODE

[75] Inventors: Lijun Bai, Vernon Hills, Ill.; William A. Adams, Nepean, Canada; Brian Conway, Rockcliffe Park, Canada; De Yang Qu, Mississauga, Canada

[73] Assignee: The University of Ottawa, Ottawa, Canada

[21] Appl. No.: 358,746

[22] Filed: Dec. 19, 1994

[30] Foreign Application Priority Data

Dec. 17, 1993 [CA] Canada ................... 2111757

[51] Int. Cl.$^6$ .................... H01M 4/30; H01M 4/50
[52] U.S. Cl. .................... 429/224; 429/50
[58] Field of Search ................ 429/224, 50, 52; 29/623.1, 730

[56] References Cited

U.S. PATENT DOCUMENTS

| | | |
|---|---|---|
| 4,451,543 | 5/1984 | Dzieciuch et al. . |
| 4,520,005 | 5/1985 | Yao . |
| 5,011,752 | 4/1991 | Kordesch et al. .......... 429/206 |
| 5,156,934 | 10/1992 | Kainthla et al. . |
| 5,419,986 | 5/1995 | Kainthla et al. .......... 429/224 |
| 5,424,145 | 6/1995 | Tomantschger et al. ........ 429/57 |

FOREIGN PATENT DOCUMENTS 1147385  5/1985  Canada .
0 146 201A1  7/1984  European Pat. Off. .

OTHER PUBLICATIONS

Rechargeability of a Chemically Modified $MnO_2$/Zn Battery System at Practically Favorable Power Levels –Department of Chemistry, University of Ottawa, Ottawa, Canada J. Electrochem Soc. vol. 140, No. 4, 884–889 (Apr. 1993).

Rechargeable Manganese Oxide Electrodes Part II. Physically Modified Materials, Ford Motor Company, Research Staff, Dearborn, MI USA J. Electrochem Soc. 238 (1987) 93–102.

*Primary Examiner*—Prince Willis, Jr.
*Assistant Examiner*—Carol Chaney
*Attorney, Agent, or Firm*—Heslin & Rothenberg, P.C.

[57] ABSTRACT

A method of enforcing a regular manganese dioxide cathode to become gradually and substantially rechargeable is described, where the cathode capacity is increased towards the theoretical capacity of the cathode. The method involves mixing 20–51 wt % $MnO_2$, 5–25 wt % metallic bismuth and 30–70 wt % graphite powder to form a homogenous mixture, subjecting the mixture to a pressing force to form an electrode and subjecting the electrode to successive discharge/charge cycles at a rate where the cathode capacity becomes greater than 75% of the theoretical capacity after 4–7 cycles. The method provides for a simple and inexpensive way of forming a rechargeable manganese dioxide cathode without complex chemical synthesis.

13 Claims, 4 Drawing Sheets

RECHARGEABLE MANGANESE DIOXIDE CATHODE

FIELD OF THE INVENTION

This invention relates to a method of enforcing a regular manganese dioxide cathode to become gradually and substantially rechargeable. The method provides for the physical mixing of powders of manganese dioxide, metallic bismuth and carbon/graphite, forming an electrode and subjecting the electrode to successive discharge/charge cycles to produce a rechargeable cathode.

BACKGROUND OF THE INVENTION

In the past, there has been a need for an inexpensive and effective way of forming a rechargeable manganese dioxide cathode by a physical mixing of compounds without a complex chemical process. There has also been a need for a rechargeable cathode that is rendered gradually and eventually substantially rechargeable in situ by subjecting the cathode to successive discharge/charge cycles. Furthermore, there has been a need for a manganese dioxide cathode that substantially increases the total capacity of the cathode by a factor of two, that is from the 1-electron to 2 -electron reaction capacity.

In addition, there has also been a need for a cathode that increases the energy density to cost ratio and that allows manganese dioxide battery systems to be operated at relatively higher power loads than existing forms of cathode.

PRIOR ART

U.S. Pat. No. 5,156,934 (Kainthia) discloses a method of making a rechargeable modified manganese dioxide cathode for use as a battery electrode. A method of mixing manganese dioxide with an aqueous solution of a water soluble salt component is described where the product is precipitated from solution. Further steps of washing, filtering and drying are conducted to obtain the modified manganese dioxide material. Combining the material with a conducting and reinforcing component and binder forms an electrode material. This patent does not disclose a method of forming a rechargeable manganese dioxide cathode by a solid mixing process and subjecting an electrode to a discharge/charge cycle to obtain rechargeability.

U.S. Pat. No. 4,451,543 (Dzieciuch) discloses a rechargeable cell which is characterized by a positive electrode formed from a manganese oxide electrode material containing a heavy metal selected from lead, bismuth and/or mixtures thereof. The electrode can be recharged in the absence of zincate ions some 200 to 300 times at a higher depth of discharge than an unmodified manganese dioxide electrode. This patent does not disclose a method of forming a rechargeable manganese dioxide cathode by a solid mixing process and subjecting an electrode to a discharge/charge cycle to obtain rechargeability.

U.S. Pat. No. 4,520,005 (Yao) discloses a method of making a birnessite compound. The birnessite compounds contain bismuth, manganese, oxygen and water in a specific ratio range. The method of preparation is characterized by mixing $Mn(NO3)_2$ with a nitrate of bismuth or lead or mixtures thereof. The cathode material is formed by adding sodium hydroxide to the solution to form a suspension. The precipitate is formed by passing oxygen through the suspension from which the birnessite compound is recovered after washing it with water and drying. This patent does not disclose a rechargeable manganese dioxide cathode by a solid mixing process and subjecting an electrode to a discharge/charge cycle to enable rechargeability.

Canadian Patent 1,310,362 (Kordesch) discloses a rechargeable alkaline manganese dioxide zinc cell having an improved cumulative capacity where the cathode is preconditioned. Preconditioning of the cathode is achieved by cycling the cathode, providing for partial discharge of the cathode (electrochemical reduction), providing for the chemical reduction of the manganese dioxide, and incorporating additives in the manganese dioxide so as to provide a cathode overcharge reserve. Those cells which were preconditioned demonstrated an improved cumulative capacity over the initial 5 cycles. A decrease in capacity was observed in these cathodes at later cycles. This patent does not disclose a method of forming a rechargeable manganese dioxide cathode with bismuth by a solid mixing process.

European Patent Application 84/305352 discloses physical mixing of a $MnO_2$, bismuth oxide, graphite powder and 9M KOH solution with an organic swelling agent to form a paste. Electrodes formed from this paste demonstrated an increase in its percentage of utilization based on two electrons during cycling. This patent application discloses only those electrode compositions with an active component of manganese dioxide less than 3 wt %.

Canadian Patent 1,226,033 discloses reacting manganese dioxide chemically with a metal salt where the metal may be bismuth, lead or mixtures of bismuth and lead. Incorporating this material into an electrode produces an electrode which may be discharged to a substantial extent of its two electron capacity. This patent is particularly directed to a "chemical method" for preparing an improved manganese dioxide electrode material.

Wroblowa (Journal of Electroanalytical Chemistry 238, 93 (1987)) discloses physical mixing of a $MnO_2$ compound with $Bi_2O_3$ compounds, forming an electrode and subjecting them to successive discharge and charge cycles.

SUMMARY OF THE INVENTION

In accordance with the invention, a method is disclosed of enforcing a regular manganese dioxide cathode to become gradually and substantially rechargeable, where the cathode capacity is increased towards the theoretical capacity of the cathode, comprising the steps of:

a) mixing 20–51 wt % $MnO_2$, 5–25 wt % metallic bismuth and 30–70 wt % graphite powder to form a homogenous mixture;

b) subjecting the mixture to a pressing force to form a cathode;

c) subjecting the cathode to successive charge/discharge cycles at a charge/discharge rate where the cathode capacity becomes greater than 75% of the theoretical capacity of the cathode between 4–7 cycles.

The present invention further provides a rechargeable cathode enforced to become gradually and substantially rechargeable prepared in accordance with the method of the invention.

Specifically, the invention provides a method of preparing a cathode comprising the steps of:

a) mixing 20 wt % $MnO_2$, 5 wt % metallic bismuth, 70 wt % graphite powder with a 44 µm size and 5 wt % PTFE as a binder to form a homogenous mixture;

b) subjecting the mixture to a pressing force to form a cathode;

c) subjecting the cathode to successive charge/discharge cycles at a C/4 rate where the cathode capacity becomes greater than 80% of the theoretical capacity of the cathode between 4–7 cycles.

The invention also provides a specific method of enforcing a regular manganese dioxide cathode to become gradually and substantially rechargeable, where the capacity of the cathode is increased towards the theoretical capacity, comprising the steps of:

a) mixing 25 wt % $MnO_2$, 25 wt % metallic bismuth, and 50 wt % graphite powder with a 44 μm size to form a homogenous mixture;

b) subjecting the mixture to a pressing force to form a cathode;

c) subjecting the cathode to successive charge/discharge cycles at a C/9 rate where the cathode capacity becomes greater than 75% of the theoretical capacity of the cathode between 4–7 cycles.

BRIEF DESCRIPTION OF THE DRAWINGS

These and other features of the invention will become more apparent from the following description in which reference is made to the appended drawings wherein.

DETAILED DESCRIPTION OF INVENTION

The manganese dioxide cathode material was prepared by mixing a $\gamma$-$MnO_2$ material (International common sample I.C. No. 2) with bismuth modified graphite. The bismuth modified graphite was prepared by mixing graphite (Lonza™ KS-44, Lonza™ KS-6 or Ketjen™ Black) and metallic bismuth (BDH catalogue #7440-69-9) to form a homogenous mixture using a mortar and pestle and high speed blender or ball mill. The KS-44 graphite has a 44 μm particle size and the KS-6 graphite has a 6 μm particle size. Ketjen™ black graphite is a very high surface area graphite. Bismuth powder used was either 200 or 500 mesh. A polytetrafluoroethylene (Teflon™) suspension (60% w/w in distilled water and $NH_2 \cdot H_2O$, pH 10) may be added as a binder. The use of binders is well known in the art. The mixture was rolled to form a film which was then compressed on a nickel mesh to form an electrode. A 9M aqueous KOH electrolyte was used and the reference electrode was Hg/HgO.

The cathodes prepared in this manner were subjected to successive constant current charge/discharge cycles. With increasing cycle number, an increase in capacity was observed towards the theoretical two-electron capacity for a manganese dioxide cathode. As well, it was observed that the higher the graphite ratio, that is the ratio of modified graphite to manganese. dioxide resulted in a longer cycle life.

The cathode of the present invention is illustrated in the following examples which are not to be construed as limitations.

EXAMPLE 1

Figure 1:
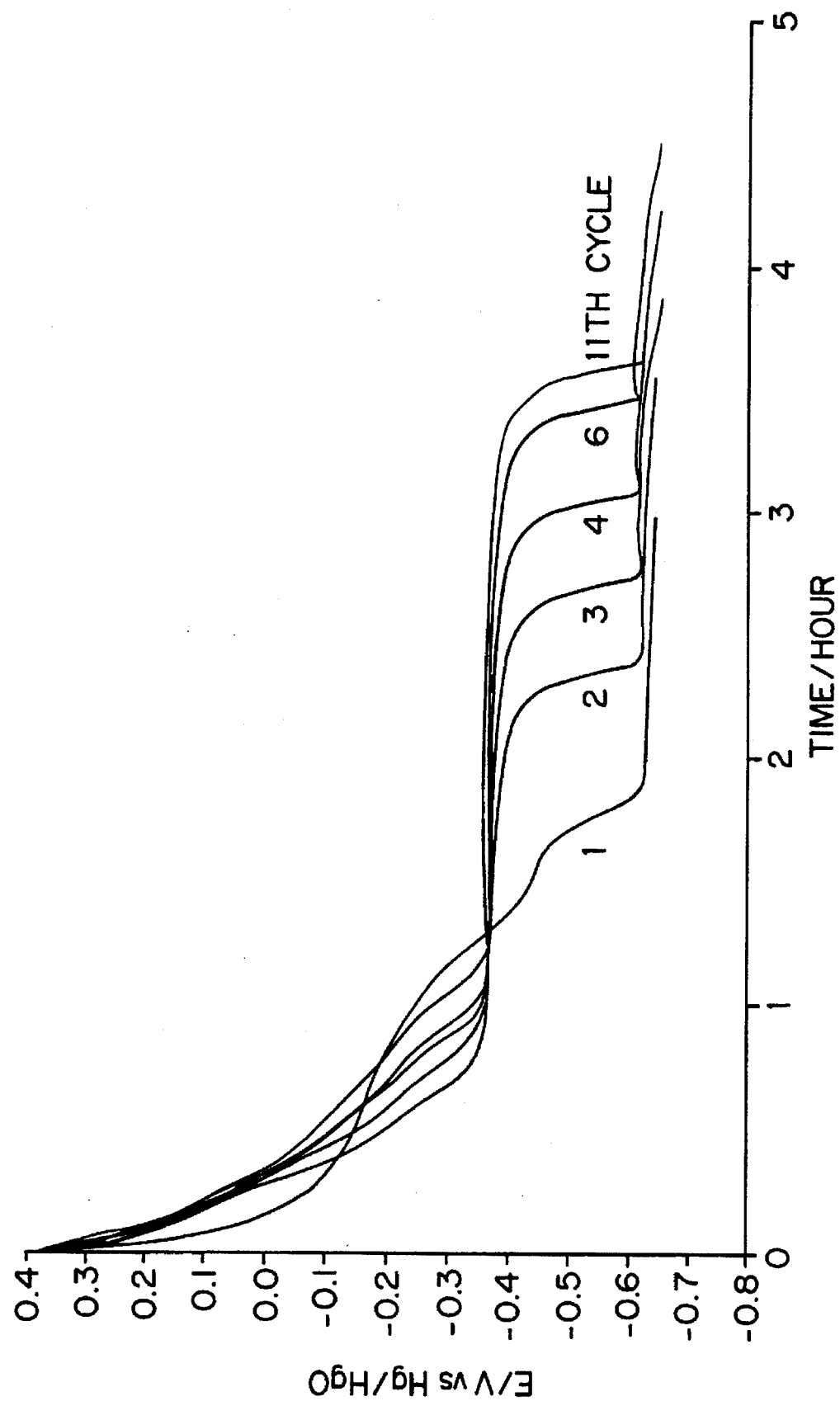
FIG. 1 is a typical discharge curve for a cathode prepared by the invention with voltage plotted along the ordinate and time along the abscissa.

FIG. 1 shows the capacity over time of a cathode prepared in accordance with the invention. The initial mixture comprised 20 wt % $\gamma$-$MnO_2$, 5 wt % bismuth powder, 70 wt % graphite (KS-44) powder. The cathode was subjected to successive constant current discharge/cycles at a C/4 rate. It is evident from the graph that at and beyond the 11th cycle, the cathode demonstrates greater than 80% of the full 2-electron capacity, the capacity incrementally increasing between the 1st and 11th cycles.

EXAMPLE 2

Figure 2:
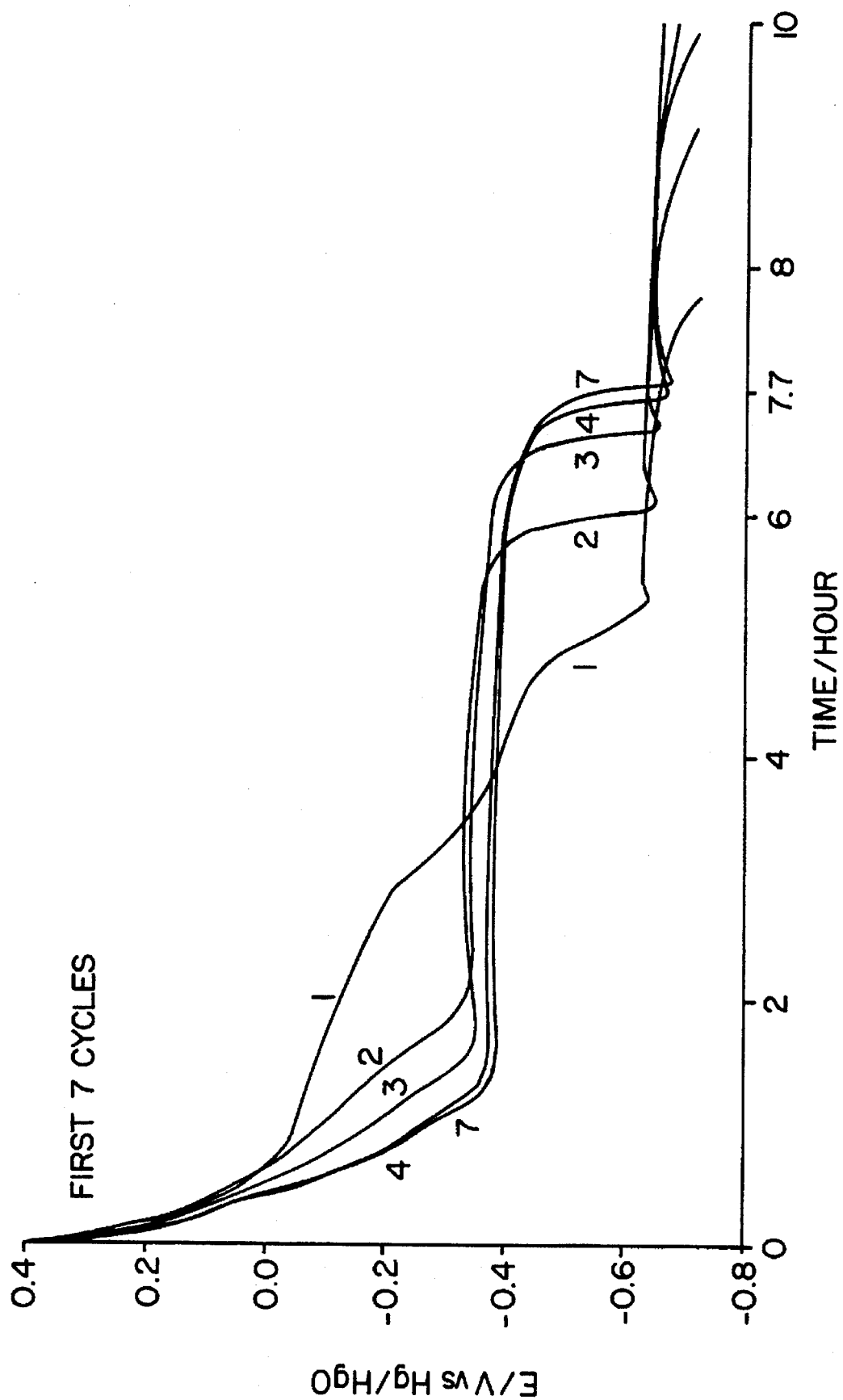
FIG. 2 is a typical discharge curve for a cathode prepared by the invention where the pressing force is 3000 psi with voltage plotted along the ordinate and time along the abscissa.
Figure 3:
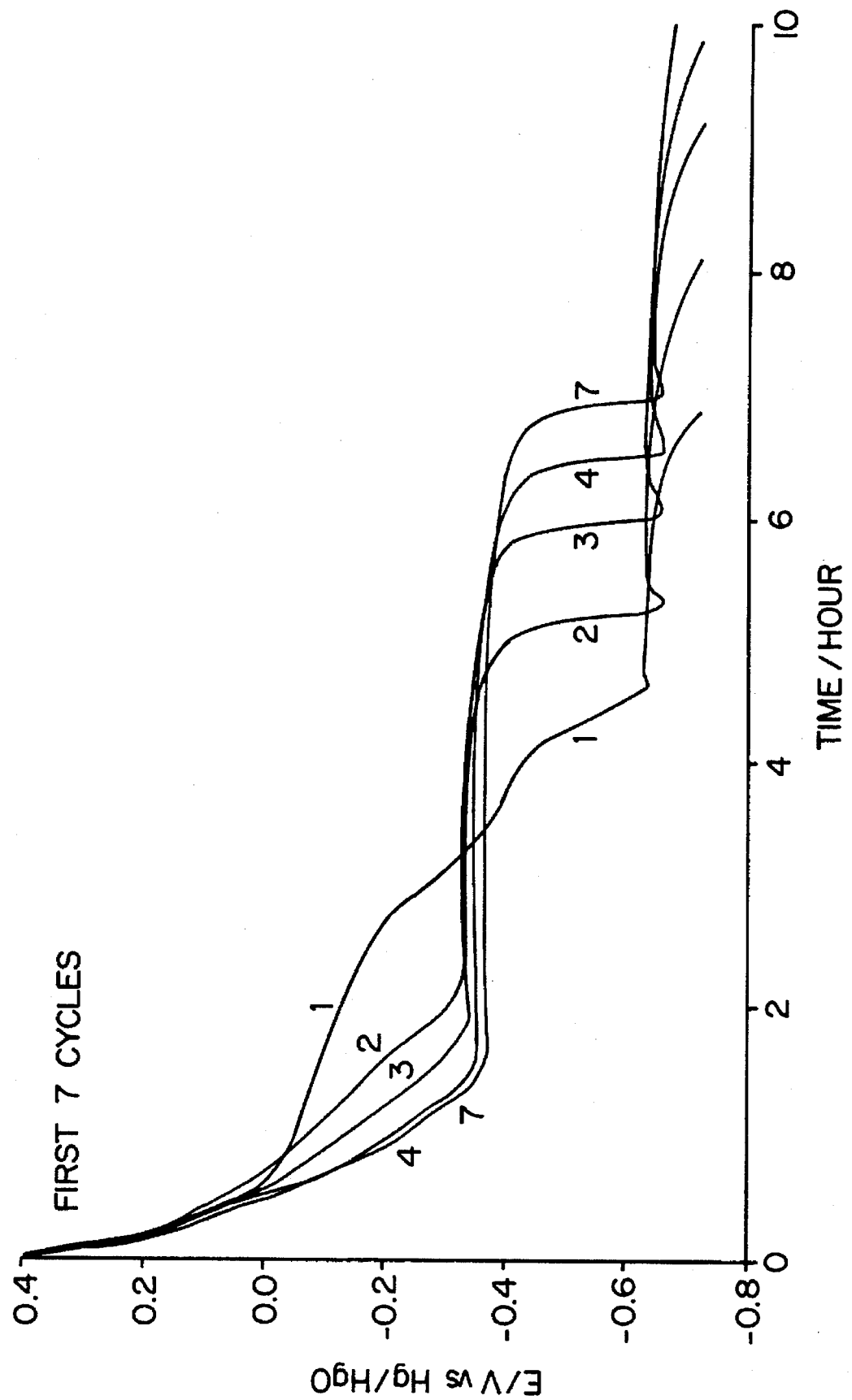
FIG. 3 is a typical discharge curve for a cathode prepared by the invention where the pressing force is 6000 psi with voltage plotted along the ordinate and time along the abscissa.

FIGS. 2 and 3 show the capacity over time (first 7 cycles) of a cathode comprising an initial mixture of 25 wt % $\gamma$-$MnO_2$, 50 wt % Lonza™ graphite (KS-44), and 25 wt % metallic bismuth powder (200 mesh) compressed to form a cathode with a 3000 psi (FIG. 2) and 6000 psi (FIG. 3) compression force respectively The cathode was subjected to successive discharge/charge cycles a C/9 rate. As shown in FIG. 1, it is evident that at and beyond the 7th cycle, the cathode demonstrates greater than 80% of the full 2-electron capacity, the capacity incrementally increasing between the 1st and 7th cycles. A comparison of FIGS. 2 and 3 indicates that the lower compression force of 3000 psi resulted in a cathode with a faster capacity modification rate.

EXAMPLE 3

Figure 4:
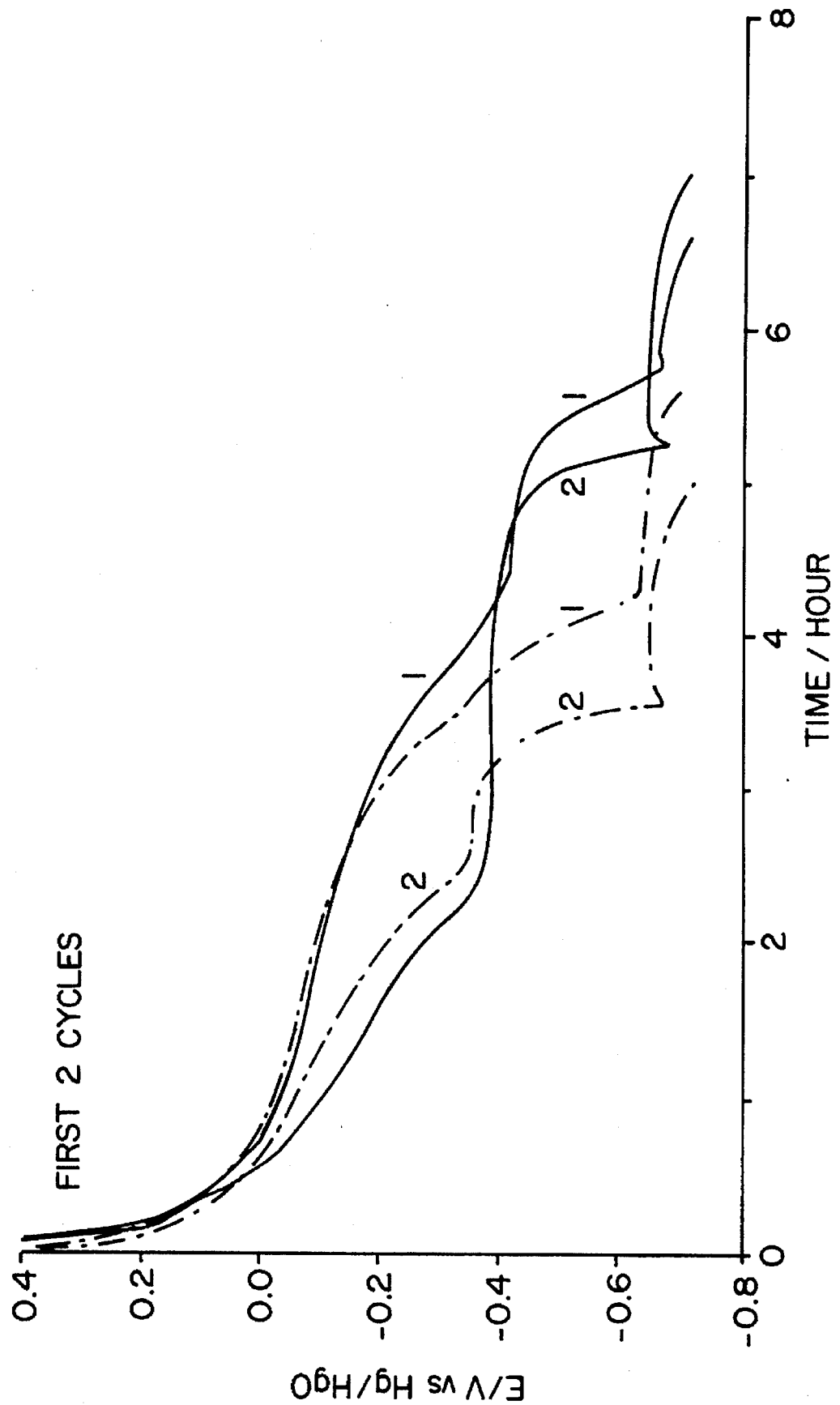
FIG. 4 is a typical discharge curve for cathodes prepared by the invention with different particle sizes of the bismuth modified graphite powders with voltage plotted along the ordinate and time along the abscissa.

FIG. 4 shows the effect of the metallic bismuth particle size on rechargeability at a C/10 rate over 2 cycles. The solid line shows a cathode prepared from 50% $MnO_2$, 20% bismuth (500 mesh), and 30% graphite (KS-6). The dashed lines show a cathode prepared with Lonza™ KS-44 graphite. It is evident from this graph that a smaller graphite particle size increases the initial capacity of the cathode.

EXAMPLE 4

A cathode was prepared with 42 wt % $MnO_2$, 6.2 wt % $Bi_2O_3$, 48 wt % graphite and 3.8 wt % binder and was subjected to charge/discharge cycles at C/10 rate as described above. By the fourth cycle, the cathode demonstrated greater than 70% of the two electron capacity.

EXAMPLE 5

A cathode was prepared with 51 wt % $\gamma$-$MnO2$, 19 wt % $Bi_2O_3$, and 30 wt % graphite (Ketjen™ Black) and was subjected to charge/discharge cycles at a C/8 rate as described above. By the fifth cycle, the cathode demonstrated a capacity of greater than 85 % of the two electron capacity. This experiment showed the effect of a high surface area carbon black graphite in improving the capacity modification rate.

EXAMPLE 6

Two cathodes were prepared with 70 wt % $\gamma$-$MnO_2$ and 30 wt % graphite (KS-6 and KS-44 respectively) and were subjected to a single discharge cycle at a C/30 rate. The cathode prepared with the KS-6 graphite showed a 30% greater initial capacity than the cathode prepared with a smaller particle size of graphite.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A method of enforcing a regular manganese dioxide cathode to become gradually and substantially rechargeable, where the capacity of the cathode is increased towards the theoretical capacity, comprising the steps of:
   a) mixing 20–51 wt % $MnO_2$, 5–25 wt % metallic bismuth and 30–70 wt % graphite powder to form a homogenous mixture;
   b) subjecting the mixture to a pressing force to form a cathode; and
   c) subjecting the cathode to successive charge/discharge cycles in an electrolyte at a charge/discharge rate where the cathode capacity becomes greater than 75% of the theoretical capacity of the cathode between 4–7 cycles.

2. The method of claim 1 further comprising mixing up to 5 wt % of a binder with the $MnO_2$, metallic bismuth and graphite to form the homogeneous mixture.

3. The method of claim 2 where the binder is polytetrafluoroethylene (PTFE).

4. The method of claim 3 where the electrolyte 9M KOH.

5. The method of claim 4 where the metallic bismuth has a particle size of 200–500 mesh.

6. The method of claim 5 where the pressing force is 3000–6000 pounds per square inch.

7. The method of claim 6 where the graphite has a particle size of 6 to 44 microns.

8. The method of claim 7 where the charge/discharge rate is a C/4–C/10 rate.

9. A rechargeable cathode prepared in accordance with claim 1.

10. A method of enforcing a regular manganese dioxide cathode to become gradually and substantially rechargeable, where the capacity of the cathode is increased towards the theoretical capacity, comprising the steps of:
    a) mixing 20 wt % $MnO_2$, 5 wt % metallic bismuth, 70 wt % graphite powder with a 44 µm size and 5 wt % PTFE as a binder to form a homogenous mixture;
    b) subjecting the mixture to a pressing force to form a cathode; and
    c) subjecting the cathode to successive charge/discharge cycles at a C/4 rate where the cathode capacity becomes greater than 80% of the theoretical capacity of the cathode between 4–7 cycles.

11. A cathode prepared in accordance with claim 10.

12. A method of enforcing a regular manganese dioxide cathode to become gradually and substantially rechargeable, where the capacity of the cathode is increased towards the theoretical capacity, comprising the steps of: a) mixing 25 wt % $MnO_2$, 25 wt % metallic bismuth, and 50 wt % graphite powder with a 44 µm size to form a homogenous mixture;
    b) subjecting the mixture to a pressing force to form a cathode; and
    c) subjecting the cathode to successive charge/discharge cycles at a C/9 rate where the cathode capacity becomes greater than 75% of the theoretical capacity of the cathode between 4–7 cycles.

13. A cathode prepared in accordance with claim 12.

* * * * *